Nov. 7, 1950  D. L. GRAHAM ET AL  2,528,511
JIG

Filed Feb. 4, 1946  3 Sheets-Sheet 1

INVENTOR.
David L Graham
Joseph Richards
BY
M.C. Hayes

ATTORNEY

Nov. 7, 1950 D. L. GRAHAM ET AL 2,528,511
JIG
Filed Feb. 4, 1946 3 Sheets-Sheet 2

INVENTOR.
David L. Graham
Joseph Richards
BY

ATTORNEY

Nov. 7, 1950   D. L. GRAHAM ET AL   2,528,511
JIG
Filed Feb. 4, 1946   3 Sheets-Sheet 3
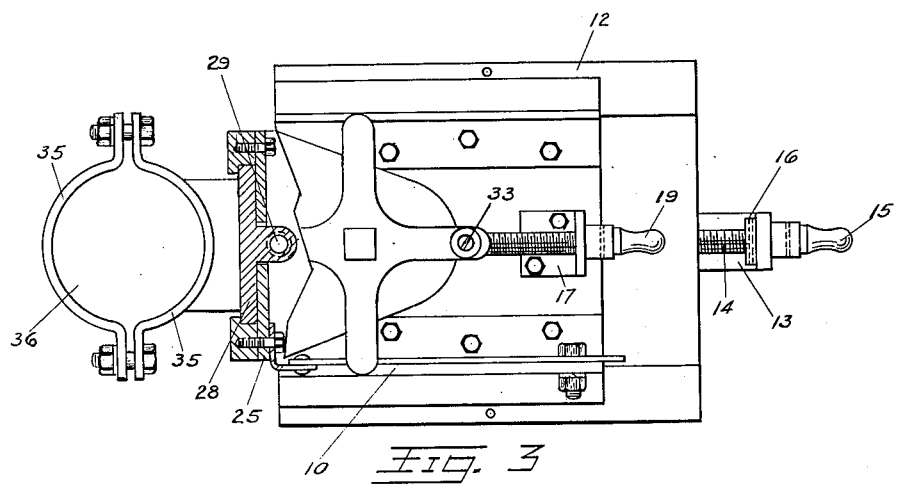
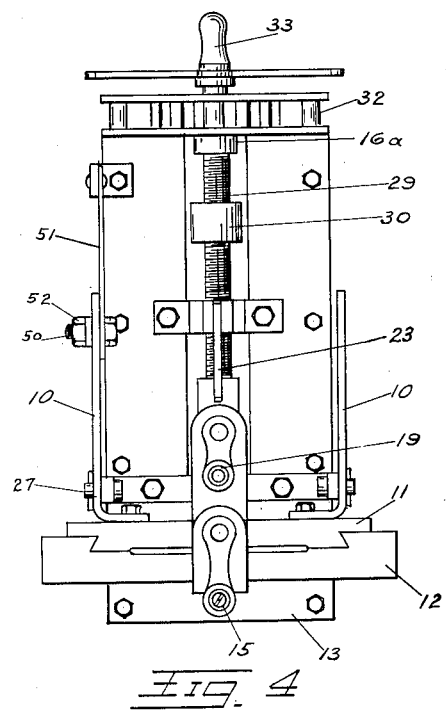
INVENTOR.
David L. Graham
Joseph Richards
BY
m.c.Hayes
ATTORNEY Patented Nov. 7, 1950

2,528,511

UNITED STATES PATENT OFFICE 2,528,511

JIG

David L. Graham, Philadelphia, and Joseph Richards, Croydon, Pa.

Application February 4, 1946, Serial No. 645,421

1 Claim. (Cl. 51—166)

(Granted under the act of March 3, 1883, as amended April 30, 1928; 370 O. G. 757)

This invention relates to tool holders and more particularly to an adjustable tool holder for supporting a grinding tool during the grinding of the beveled surfaces of a hatchway.

Hatches aboard ship serve not only as doors closing the passageway between decks or between rooms, but also as watertight barriers preventing the passage of water through bulkheads or decks. It is therefore imperative to grind accurately the beveled faces of hatchways so that the hatches which close off these hatchways will fit closely. Since there are many hatchways to be ground on even small ships, portable grinding tools are used. The portable grinders are usually so heavy and cumbersome that manual operation of the grinding tool is not feasible if accurate grinding is required.

It is an object of the present invention to supply a portable jig that will permit accurate grinding of the straight or curved beveled surfaces of a hatchway.

Another object is to provide an adjustable jig that will cover the entire range of positions that a tool may take in grinding the beveled surfaces of all shipboard hatchways.

Another object is to provide an adjustable jig which will be free of the hatchway to permit access through the hatchway during the grinding operation.

Further objects and advantages of this invention, as well as its construction, arrangement and operation, will be apparent from the following description and claim in connection with the accompanying drawings, in which, Fig. 1 is a perspective view of the jig shown in operation with pintle support for radial guidance.

Fig. 3 is a top view of Fig. 2.

Fig. 4 is a right side view of Fig. 3.

Figure 2:
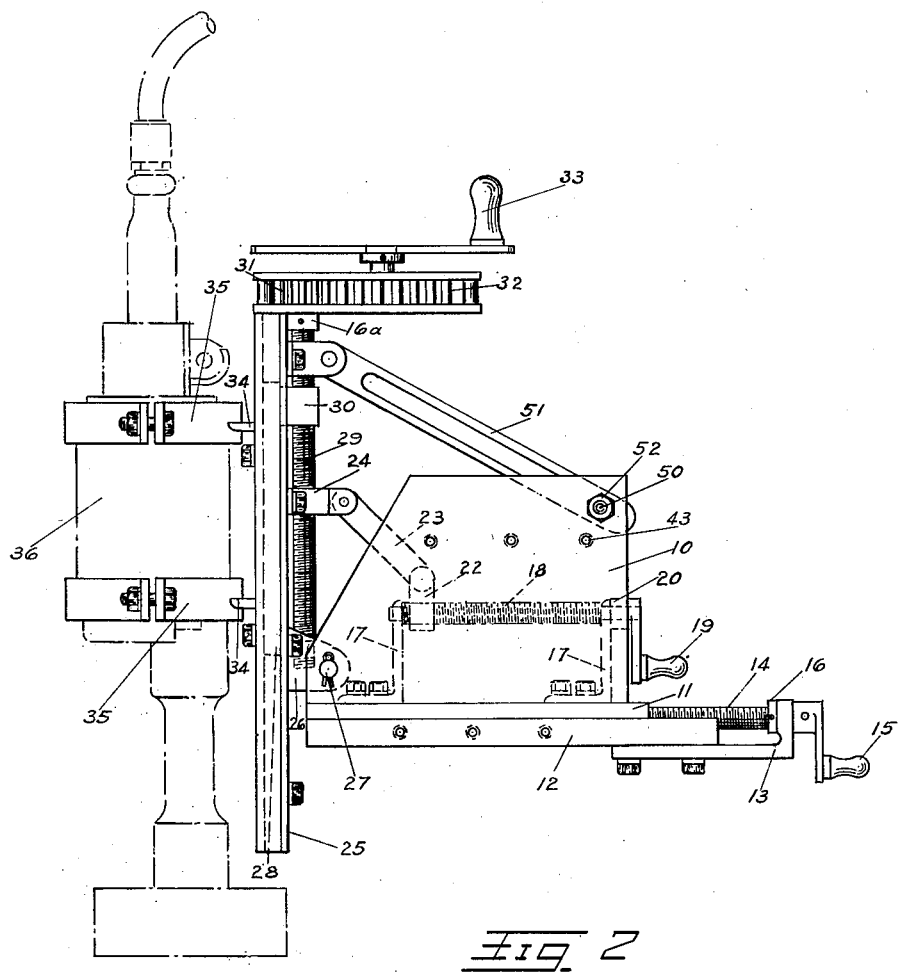
Fig. 2 is an elevation view of the jig with pintle support removed.

In Fig. 2 there is shown a rigid housing 10 which is secured to a gib 11, the latter riding on a platform 12. Bolted or otherwise detachably secured to platform 12 is a bearing stanchion 13, which is one of the supports for a screw 14. The screw 14 engages a threaded bore (not shown) inside the gib 11. The turning of handle 15 urges the gib 11 to move, causing the housing 10 to do likewise. A thrust collar 16 prevents any to and fro motion of the handle 15.

Centrally located on the gib 11 are support bearings 17, which support a screw 18 at a distance sufficiently above the gib 11 so that the latter will not interfere with the turning of the handle 19. A threaded member 22, engaging the screw 18, has a rigid arm 23 rotatably secured to it. The arm 23 at its other end is rotatably secured to a plate 24 which in turn is bolted to the vertical plate 25. The plate 25 is rotatably supported on a rod 27 which is attached to the walls of the housing 10. A connecting plate 26 joins the plate 25 to the rod 27.

Slidably mounted with respect to rigid plate 25 is a gib 28 secured to the vertical screw 29 through the threaded lug 30. The top of the screw 29 has a gear 31, which meshes with the larger gear 32 suitably supported on the rigid plate 25. The turning of the handle 33 rotates the larger gear 32 to rotate the small gear 31, turning the screw 29 so that the lug 30 and gib 28 will ascend or descend along the screw 29. A locknut 16a prevents any to and fro motion of the screw 29.

Mounted on the gib 28 are connecting elements 34 adapted to engage a pair of collars 35. These collars 35 may be of any shape, depending upon the shape of the tool 36 which is to be accommodated thereby.

Figure 1:
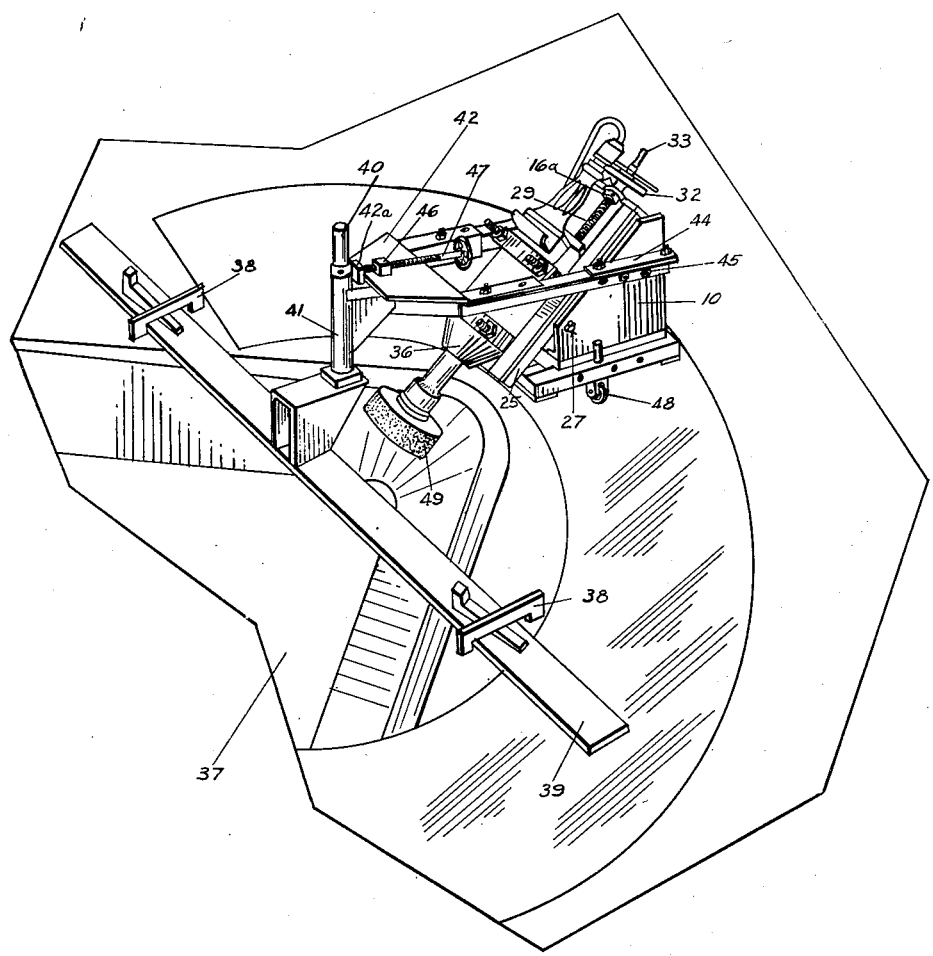

A curved section of hatch 37, shown in Fig. 1, is the workpiece to be ground. A pair of anchor elements 38 are brazed to the deck of the ship close by the hatch and a crosspiece 39 is wedged between the anchor elements 38 against the deck. Midway along the crosspiece 39 is an offset upright pintle 40 to which is secured a sleeve 41. The sleeve 41 not only rotates about the pintle 40 but also carries a horizontal platform 42.

A plurality of holes 43 are along the side of the housing 10 and are adapted to accommodate fastening means for the arms 44, one on each side of the housing. Arms 44 are secured indirectly to the horizontal platform 42, the connecting element being the braces 45. Holes are punched at intervals along the arms 44, the braces 45, and the extensions of the platform 42 so that the sleeve 41 may be set at different positions away from the grinding tool 36 held by this jig.

Mounted on top of the horizontal platform 42 is a threaded block 46 which engages a screw 47, the foot of which turns freely in the swivel block 42a secured to sleeve 41. The horizontal platform 42 is slidably mounted relative to sleeve 41 so that turning of the screw 47 will afford fine adjustment of the distance that the grinding tool is from pintle 40. Wheels 48 are provided to support stand 12.

To raise or lower the grinding tool, the handle 33 is turned, causing the gib 28 to ascend or descend relative to the rigid plate 25, depending upon the sense of rotation of the handle 33. To adjust the grinding wheel 49 of the power driven tool 36, the turning of the handle 19 will cause the threaded member 22 to travel along the screw 18. Prior to turning the handle 19 the nut 52 is loosened so that the rigid plate 25 can be turned away from the vertical plane. The slotted arm 51 travels past the bolt 50 during the rotation of the rigid plate 25. When the plate 25 has been turned to the desired angle, the nut 52 is tightened, thus maintaining the rigid platform at the desired angle from the vertical.

The turning of the handle 15 provides for horizontal changes in the position of the tool. The turning of the handle 19 rotates the tool away from the vertical plane. The turning of the handle 33 changes the position of the tool along the vertical plane.

In actual practice, the present jig has saved as much as ninety-six hours in the grinding of a single hatch. Moreover, the jig affords greater precision of grinding than was previously obtained with the use of manually operated grinding tools, and the various adjustments of the grinder, both fine and rough, add considerably to the working range of the grinding tool.

The more accurate grinding thus obtained eliminates the use of hatch-cover plug templates to repeatedly test the metal to metal fit of the hatch and its corresponding hatchway.

The entire jig with power-driven tool attached is easily lifted and carried by two men. This portability is an advantageous feature in that there is no need for assembly and disassembly of cumbersome fixtures and supports for the grinding of a hatchway.

Other advantages of using the present jig include accessibility from one deck to another through the hatchway 37 without interference with the grinding operation. There is another factor which is inherent to the structure of the jig, namely, the increased safety of using the present jig. Should the wheel 49 explode during the grinding of the hatch bevel, the platform 42 is very apt to take the initial shock of the wheel 49. Also, the operator, by not directly holding the tool 36, has time to quickly move from the scene should the wheel 49 explode.

Changes can be made in this invention without departing from the spirit and scope thereof as set forth in the appended claim.

The invention described herein may be manufactured and used by or for the Government of the United States of America for governmental purposes without the payment of any royalties thereon or therefor.

What is claimed is:

A tool-holding device comprising a platform, a housing slidably mounted on said platform, a first screw mounted for free rotation on said platform and threaded into said housing for sliding said housing, a plate rotatably mounted on said housing, a first bracket on said plate, a second screw mounted for free rotation on said housing, a traveler threaded on said screw for movement toward and away from said plate, a link connecting said traveler and bracket, a second bracket on said plate, an arm rotatably mounted on said second bracket and extending into sliding engagement with said housing, and means on said housing for selectively locking said arm against sliding relative to said housing, a toolholder slidably mounted on said plate, and a third screw mounted for free rotation on said plate and threaded into said toolholder for sliding said toolholder.

DAVID L. GRAHAM.
JOSEPH RICHARDS.

REFERENCES CITED

The following references are of record in the file of this patent:

UNITED STATES PATENTS

| Number | Name | Date |
|---|---|---|
| 1,527,357 | Gray | Feb. 24, 1925 |
| 1,785,737 | Jones | Dec. 23, 1930 |
| 1,799,109 | Lyne | Mar. 31, 1931 |
| 1,933,677 | Moore | Nov. 7, 1933 |
| 1,996,825 | Ocenasek | Apr. 9, 1935 |
| 2,261,696 | Ocenasek | Nov. 4, 1941 |
| 2,289,874 | Curtis | July 14, 1942 |
| 2,400,783 | Roseberry | May 21, 1946 |
| 2,412,199 | Blood | Dec. 10, 1946 |